United States Patent
Han et al.

(10) Patent No.: US 12,049,308 B2
(45) Date of Patent: Jul. 30, 2024

(54) COTTON TOPPING UNMANNED AERIAL VEHICLE HAVING CUTTER DISCS AND FRONT GRAIN LIFTING BAFFLE PLATES

(71) Applicant: SHANDONG UNIVERSITY OF TECHNOLOGY, Zibo (CN)

(72) Inventors: Xin Han, Zibo (CN); Yubin Lan, Zibo (CN); Juan Wang, Zibo (CN); Zhaoqi Liu, Zibo (CN); Ziyue Zhao, Zibo (CN); Changsheng Xi, Zibo (CN); Jieying Chen, Zibo (CN); Luming Sha, Zibo (CN)

(73) Assignee: SHANDONG UNIVERSITY OF TECHNOLOGY, Zibo (CN)

( * ) Notice: Subject to any disclaimer, the term of this patent is extended or adjusted under 35 U.S.C. 154(b) by 561 days.

(21) Appl. No.: 17/435,001

(22) PCT Filed: Aug. 31, 2020

(86) PCT No.: PCT/CN2020/112626
§ 371 (c)(1),
(2) Date: Aug. 30, 2021

(87) PCT Pub. No.: WO2021/103722
PCT Pub. Date: Jun. 3, 2021

(65) Prior Publication Data
US 2022/0135220 A1    May 5, 2022

(30) Foreign Application Priority Data
Nov. 27, 2019  (CN) .......................... 201911180755.3

(51) Int. Cl.
*B64C 39/02*    (2023.01)
*A01D 47/00*   (2006.01)
(Continued)

(52) U.S. Cl.
CPC ............ *B64C 39/024* (2013.01); *A01D 47/00* (2013.01); *A01G 22/50* (2018.02); *B64U 10/13* (2023.01); *B64U 2101/00* (2023.01)

(58) Field of Classification Search
CPC . A01D 47/00; A01G 3/08; A01G 7/06; A01G 22/50; B64C 39/024; B64U 10/13;
(Continued)

(56) References Cited

U.S. PATENT DOCUMENTS

| 10,538,316 B2 * | 1/2020 | Chen ....................... F16B 2/185 |
| 10,730,619 B2 * | 8/2020 | Ni ............................. B64C 1/30 |

(Continued)

FOREIGN PATENT DOCUMENTS

| CN | 206481653 U | 9/2017 |
| CN | 107466700 A * | 12/2017 ............... A01G 7/06 |

(Continued)

OTHER PUBLICATIONS

International Search Report and Written Opinion for Application No. PCT/CN2020/112626, dated Nov. 2, 2020.

*Primary Examiner* — Arpad Fabian-Kovacs
(74) *Attorney, Agent, or Firm* — MARSHALL, GERSTEIN & BORUN LLP

(57) ABSTRACT

A cotton topping unmanned aerial vehicle having cutter discs and front grain lifting baffle plates is provided, the unmanned aerial vehicle includes an unmanned aerial vehicle body, a carrying component, a grain lifting component, and a cutting component. The carrying component includes a suspension, an electric push rod mounting base, an electric push rod, a motor mounting base, and motors. An upper end of the electric push rod is bolted to the electric push rod mounting base. The motor mounting base is welded to a lower end of the electric push rod. The grain lifting component is grain lifting baffle plates which include a left (Continued)

baffle plate and a right baffle plate, and both the left baffle plate and the right baffle plate are welded to guard plates.

10 Claims, 1 Drawing Sheet

(51) Int. Cl.
 *A01G 22/50* (2018.01)
 *B64U 10/13* (2023.01)
 *B64U 101/00* (2023.01)
(58) Field of Classification Search
 CPC .... B64U 10/14; B64U 50/19; B64U 2101/00; B64U 2201/104
 See application file for complete search history.

(56) References Cited

U.S. PATENT DOCUMENTS

| | | | | |
|---|---|---|---|---|
| 2013/0068892 | A1* | 3/2013 | Bin Desa | B64U 30/29 701/4 |
| 2017/0129602 | A1* | 5/2017 | Alduaiji | B64C 39/024 |
| 2018/0354625 | A1* | 12/2018 | Verkade | B64U 40/00 |
| 2019/0061933 | A1* | 2/2019 | Cappelleri | G05D 1/101 |
| 2020/0367441 | A1* | 11/2020 | Guzmán López | A01G 23/095 |
| 2022/0174932 | A1* | 6/2022 | Ravanat | A01M 5/02 |
| 2023/0278732 | A1* | 9/2023 | Nordkvist | B64U 20/87 244/75.1 |

FOREIGN PATENT DOCUMENTS

| | | | | |
|---|---|---|---|---|
| CN | 108423175 | A | 8/2018 | |
| CN | 108633482 | A * | 10/2018 | ............. B64C 39/02 |
| CN | 109526447 | A | 3/2019 | |
| CN | 109906796 | A | 6/2019 | |
| CN | 110383998 | A * | 10/2019 | ............... A01G 3/08 |
| CN | 110741828 | A | 2/2020 | |
| CN | 110741829 | A * | 2/2020 | ............... A01G 3/08 |
| CN | 110741830 | A | 2/2020 | |
| CN | 211090793 | U * | 7/2020 | ............. B64U 50/19 |
| CN | 211090794 | U | 7/2020 | |
| CN | 211240953 | U * | 8/2020 | ............. B64U 50/19 |
| CN | 113273397 | A * | 8/2021 | ............. B64U 50/19 |
| CN | 215500569 | U * | 1/2022 | ............... A01G 3/08 |
| CN | 114148522 | A * | 3/2022 | ............. B64C 39/02 |
| CN | 111418349 | B * | 5/2022 | ............. A01G 46/30 |
| KR | 20170118641 | A | 10/2017 | |
| WO | WO-2018033923 | A1 * | 2/2018 | ........... A01D 46/253 |
| WO | WO-2018033925 | A1 * | 2/2018 | ........... A01D 46/253 |
| WO | WO-2018033926 | A1 * | 2/2018 | ........... A01D 46/253 |
| WO | WO-2021103723 | A1 * | 6/2021 | ............... A01G 3/08 |

* cited by examiner

COTTON TOPPING UNMANNED AERIAL VEHICLE HAVING CUTTER DISCS AND FRONT GRAIN LIFTING BAFFLE PLATES

CROSS REFERENCE TO RELATED APPLICATION

This patent application claims the benefit and priority of Chinese Patent Application No. 201911180755.3 filed on Nov. 27, 2019, and entitled "Cotton Topping Unmanned Aerial Vehicle Having Cutter Discs and Front Grain Lifting Baffle Plates", the disclosure of which is incorporated by reference herein in its entirety.

TECHNICAL FIELD

The present disclosure relates to a cotton topping unmanned aerial vehicle. During the topping operation, a grain lifting baffle plate is configured to reduce the disturbance on the cotton plant caused by the downward pressure wind field of the unmanned aerial vehicle, the cutter disc is adopted to complete the cutting of the cotton top, so as to achieve accurate, efficient and unmanned cotton topping operation. More specifically, the present disclosure refers to a cotton topping unmanned aerial vehicle having cutter discs and front grain lifting baffle plates.

BACKGROUND ART

With the increasing mechanization level in the agricultural production process, an accurate and efficient cotton topping method is desired, and the country also proposes to vigorously develop industrial-grade unmanned aerial vehicles with high market demand. However, there are three main cotton topping methods in China: manual topping, ground mechanical topping and chemical topping. The efficiency of the manual topping operation is low, the ground mechanical topping machine may damage the plants and compact the ground to a large extent, and the chemical topping operation easily causes the secondary growth of the cotton tops. Therefore, in a long period of time in the future, a cotton topping unmanned aerial vehicle which can implement the cotton topping operation with high efficiency has a good prospect. However, there is still a long way to go before the cotton topping operation can get rid of manual labor.

At present, as far as cotton topping operation systems concerned, there are mainly ground mechanical cotton topping operation systems, chemical cotton topping operation systems and unmanned aerial vehicle cotton topping operation systems. For example, the patent application publication No. 201711337839.4 provides a device and method for cotton topping. The patent application publication No. 201910607867.6 provides a cotton topping agent and a preparation method thereof. The patent application publication No. 201710861395.8 provides a cotton topping machine with unmanned aerial vehicles as carriers. However, a integrated unmanned aerial vehicle cotton topping operation system, which can reduce the influence of the downward pressure wind field of the unmanned aerial vehicle by the front grain lifting baffle plates and accurately and quickly cut off the cotton tops by using the cutter disc, has not been reported. In particular, it is a new direction worthy of exploration and having great prospects to develop a cotton topping unmanned aerial vehicle having cutter discs and front grain lifting baffle plates by using the unmanned aerial vehicle with high working efficiency and precise operation capability for cotton topping operation, and through reducing the influence of the downward pressure wind field of the unmanned aerial vehicle by the grain lifting baffle plate and quickly cutting off the cotton top by the cutter disc.

SUMMARY

The embodiments aim to provide a cotton topping unmanned aerial vehicle having cutter discs and front grain lifting baffle plates, so as to solve the practical problems that the manual topping operation is low in efficiency, the ground mechanical topping machine damages the plants and compacts the ground to a large extent, chemical topping easily causes the secondary growth of cotton tops, and the conventional unmanned aerial vehicle cotton topping is unstable due to the influence of the downward pressure wind field. In the process of cotton topping, the cotton topping unmanned aerial vehicle having cutter discs and front grain lifting baffle plates can reduce the influence of the downward pressure wind field of the unmanned aerial vehicle, and realize the accurate and efficient cotton topping operation.

The technical problem is solved by the following technical scheme. The present disclosure provides a cotton topping unmanned aerial vehicle having cutter disc and front grain lifting baffle plates, which includes an unmanned aerial vehicle body, a carrying component, a grain lifting component and a cutting component. The carrying component, the grain lifting component and the cutting component are all carried and fixed on the unmanned aerial vehicle body. The carrying component includes a suspension, an electric push rod mounting base, an electric push rod, a motor mounting base and motors. The suspension is bolted to the bottom of the unmanned aerial vehicle body, the electric push rod mounting base is bolted to the suspension and configured for mounting the electric push rod. An upper end of the electric push rod is bolted to the electric push rod mounting base to enable extending and retracting of the grain lifting component and the cutting component so as to facilitate taking off and landing of the unmanned aerial vehicle, the motor mounting base is welded to a lower end of the electric push rod. The motor mounting base is configured for mounting the motors on the one hand, and on the other hand, has a flow guiding function to reduce the disturbance on cotton tops to be cut caused by a downward pressure wind field of the unmanned aerial vehicle body. Each of the motors is bolted to the motor mounting base, the motors are powered by a power supply of the unmanned aerial vehicle body, output shafts of the motors are connected with a cutter disc set which is configured for cutting of the cotton top, and a number of motors is 2. The grain lifting component is grain lifting baffle plates which include a left baffle plate and a right baffle plate, both the left baffle plate and the right baffle plate are welded to guard plates. The grain lifting baffle plates is configured for gathering the cotton tops to be cut. The cutting component includes the guard plates and the cutter disc set. The guard plates are welded to housings of the motors and configured for protecting the cutter disc set, the number of guard plates is 2, the cutter disc set is formed by a pair of cutter discs which rotate in opposite directions and have vertical gap therebetween and are configured for cutting the cotton top. The cutter discs each are provided with a circle of cutter teeth, and by virtue of relative rotation between the cutter teethes on the cutter disc set, cotton stalks are cut, and the cotton tops cut are brought to a rear of the unmanned aerial vehicle in a forward direction.

In some embodiments, the unmanned aerial vehicle body may be one selected from a group consisted of an electric unmanned aerial vehicle body, an oil-powered unmanned aerial vehicle body and an oil-electric hybrid unmanned aerial vehicle body.

In some embodiments, the motor mounting base may be shaped as a square, and a side length of the square is 25 cm-35 cm.

In some embodiments, the vertical gap between the pair of cutter discs in the cutter disc set may be 0.5 mm-1.5 mm.

In some embodiments, a diameter of the cutter disc in the cutter disc set may be 5 cm-10 cm, and a rotating speed of the cutter disc may be 12,000 r/min-18,000 r/min.

The working process of the cotton topping unmanned aerial vehicle having cutter discs and front grain lifting baffle plates is as follows. After the unmanned aerial vehicle body is powered on and takes off, the electric push rod extends to locate the grain lifting component and the cutting component below a tripod of the unmanned aerial vehicle body. The unmanned aerial vehicle body adjusts the flying height and cutting position of the unmanned aerial vehicle body through a GPS positioning system. The grain lifting baffle plates gather cotton branches, cotton leaves and cotton tops into the cutter disc set. The output shafts of motors drive the cutter discs to rotate at high speed in opposite directions to cut the cotton tops. The guard plates protect the cutter disc set to prevent cotton branches and cotton leaves from winding around the cutter disc set.

Compared with the conventional art, the embodiments have the following advantages. (1) The cotton topping unmanned aerial vehicle having cutter discs and front grain lifting baffle plates is provided to solve the practical problems that the manual topping operation is low in efficiency, the ground mechanical topping machine damages the plants and compacts the ground to a large extent, chemical topping easily causes the secondary growth of cotton tops, and the conventional unmanned aerial vehicle for cotton topping is unstable due to the influence of the downward pressure wind field, the cotton topping unmanned aerial vehicle improves the working efficiency of cotton topping operation. (2) The two cutter discs installed in the cotton topping unmanned aerial vehicle having cutter discs and front grain lifting baffle plates rotate at high speed in opposite directions, thus reducing the cutting injury area of the plant. (3) According to the cotton topping unmanned aerial vehicle having cutter discs and front grain lifting baffle plates, when the unmanned aerial vehicle carries out cotton topping operation, the front grain lifting baffle plate reduces the disturbance on the cotton plant caused by the downward pressure wind field of the unmanned aerial vehicle. (4) According to the cotton topping unmanned aerial vehicle having cutter discs and front grain lifting baffle plates, the difficulty in taking off and landing of the unmanned aerial vehicle can be solved by the electric push rod.

LIST OF THE REFERENCE CHARACTERS

1 unmanned aerial vehicle body; 2 suspension; 3 electric push rod mounting base; 4 electric push rod; 5 motor mounting base; 6 motor; 7 guard plate; 8 grain lifting baffle plate; and 9 cutter disc set.

DETAILED DESCRIPTION OF THE EMBODIMENTS

The present disclosure will be further explained in detail with reference to the drawings and embodiments.

Figure 1:
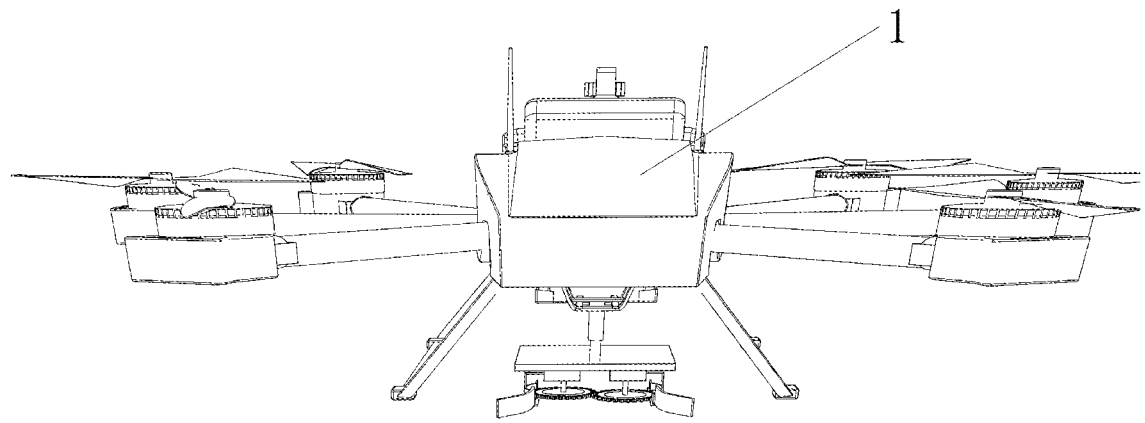
FIG. 1 is a structural diagram of the whole machine of a cotton topping unmanned aerial vehicle having cutter discs and front grain lifting baffle plates according to the present disclosure.
Figure 2:
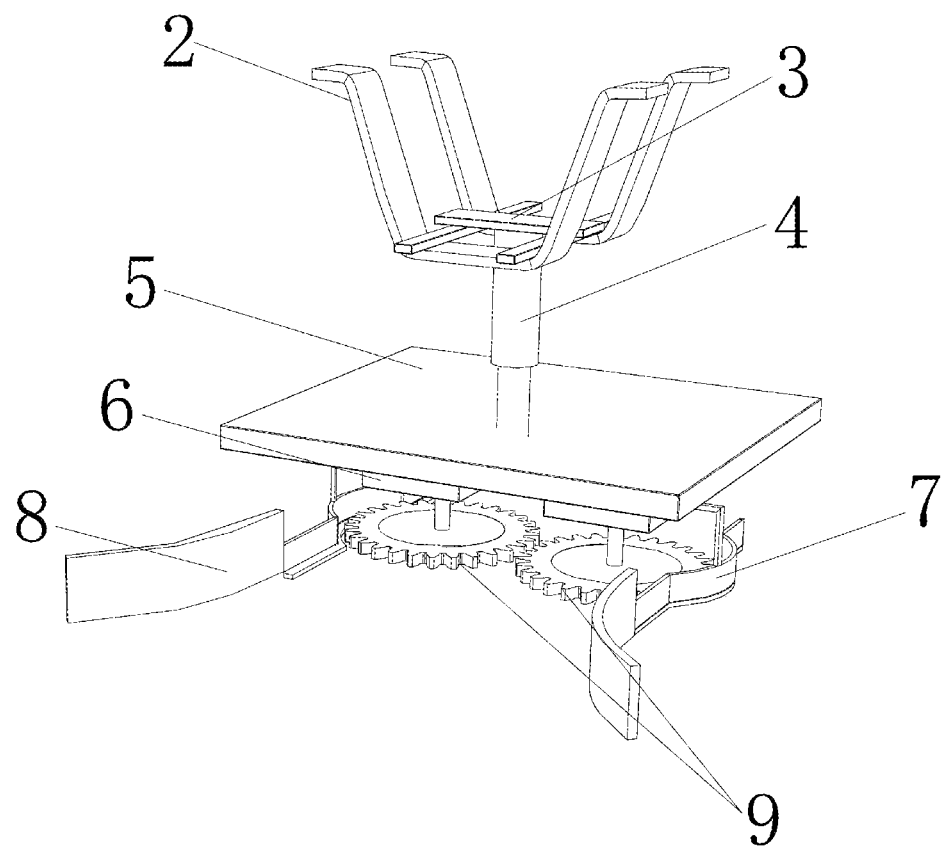
FIG. 2 is a structural diagram of the cotton topping unmanned aerial vehicle having the cutter discs and the front grain lifting baffle plates according to the present disclosure after removing the unmanned aerial vehicle body.

Referring to FIG. 1 and FIG. 2, the present disclosure provides the cotton topping unmanned aerial vehicle having cutter discs and front grain lifting baffle plates, which includes an unmanned aerial vehicle body 1, a carrying component, a grain lifting component and a cutting component. The unmanned aerial vehicle body 1 is an electric unmanned aerial vehicle body. The carrying component, the grain lifting component and the cutting component are all carried and fixed on the unmanned aerial vehicle body 1.

The carrying component includes a suspension 2, an electric push rod mounting base 3, an electric push rod 4, a motor mounting base 5 and motors 6. The suspension 2 is bolted to the bottom of the unmanned aerial vehicle body 1. The electric push rod mounting base 3 is bolted to the suspension 2 for mounting the electric push rod 4. The upper end of the electric push rod 4 is bolted to the electric push rod mounting base 3 to enable the extending and retracting of the grain lifting component and the cutting component to facilitate taking off and landing of the unmanned aerial vehicle. The motor mounting base 5 is welded to the lower end of the electric push rod 4. The motor mounting base 5 is configured for mounting the motors 6 on the one hand, and on the other hand, has a flow guiding function to reduce the disturbance on the cotton top to be cut caused by the downward pressure wind field of the unmanned aerial vehicle body 1. The motor mounting base 5 is shaped as a square, and a side length of the square is 30 cm. Each of the motors 6 is bolted to the motor mounting base 5. The motors 6 are powered by the power supply of the unmanned aerial vehicle body 1. The output shafts of the motor 6 are connected with the cutter disc set 9 which is configured for cutting the cotton top, and the number of motors is 2.

The grain lifting component refers to the grain lifting baffle plates 8 which includes a left baffle plate and a right baffle plate. Both the left baffle plate and the right baffle plate are welded to guard plates 7. The grain lifting baffle plates 8 are configured for gathering the cotton top to be cut.

The cutting component includes guard plates 7 and the cutter disc set 9. The guard plates 7 are welded to a housing of the motors 6, for protecting the cutter disc set 9. The number of guard plates is 2. The cutter disc set 9 is formed by a pair of cutter discs which rotate in opposite directions, have a vertical gap and is configured for cutting the cotton top. The diameter of the cutter discs is 8 cm, the vertical gap is 1 mm, and the rotating speed is 15000 r/min. The cutter discs each are provided with a circle of cutter teeth, and by virtue of the relative rotation between the cutter teeth on the cutter disc set 9, it is convenient to cut cotton stalks while bringing the cut cotton top to the rear of the unmanned aerial vehicle in the forward direction.

The working process of the cotton topping unmanned aerial vehicle having the cutter discs and front grain lifting baffle plates is as follows. After the unmanned aerial vehicle body 1 is powered on and takes off, the electric push rod 4 in the carrying component extends to locate the grain lifting component and the cutting component below a tripod of the unmanned aerial vehicle body 1. The unmanned aerial vehicle body 1 adjusts the flying height and cutting position of the unmanned aerial vehicle body 1 through a GPS positioning system. The grain lifting baffle plates gather cotton branches, cotton leaves and cotton tops into the cutter disc set 9. The output shafts of motors drives the cutter discs to rotate at high speed in opposite directions to cut the cotton top. The guard plates 7 protect the cutter disc set 9 to prevent cotton branches and cotton leaves from winding around the cutter disc set 9.

Finally, it should be noted that the above embodiments are only used to show and describe the basic principles, main features and advantages of the present disclosure. Those skilled in the art should understand that the present disclosure is not limited by the above embodiments, and that there will be various modifications or equivalent substitutions without departing from the spirit and scope of the present disclosure, but any modifications or equivalent substitutions made without departing from the spirit and scope of the present disclosure should be included in the claims of the present disclosure.

What is claimed is:

1. A cotton topping unmanned aerial vehicle having cutter discs and front grain lifting baffle plates, comprising an unmanned aerial vehicle body, a carrying component, a grain lifting component and a cutting component, wherein the carrying component, the grain lifting component and the cutting component are all carried and fixed on the unmanned aerial vehicle body; the carrying component comprises a suspension, an electric push rod mounting base, an electric push rod, a motor mounting base and motors, wherein the suspension is bolted to the bottom of the unmanned aerial vehicle body, the electric push rod mounting base is bolted to the suspension and configured for mounting the electric push rod, an upper end of the electric push rod is bolted to the electric push rod mounting base to enable extending and retracting of the grain lifting component and the cutting component so as to facilitate taking off and landing of the unmanned aerial vehicle, the motor mounting base is welded to a lower end of the electric push rod; the motor mounting base is configured for mounting the motors on the one hand, and on the other hand, has a flow guiding function to reduce the disturbance on cotton tops to be cut caused by a downward pressure wind field of the unmanned aerial vehicle body, each of the motors is bolted to the motor mounting base, the motors are powered by a power supply of the unmanned aerial vehicle body, output shafts of the motors are connected with a cutter disc set which is configured for cutting the cotton tops, and a number of motors is two; the grain lifting component is grain lifting baffle plates which comprise a left baffle plate and a right baffle plate, both the left baffle plate and the right baffle plate are welded to guard plates, the grain lifting baffle plates is configured for gathering the cotton tops to be cut; the cutting component comprises the guard plates and the cutter disc set, wherein the guard plates are welded to housings of the motors and configured for protecting the cutter disc set, the number of guard plates is two, the cutter disc set is formed by a pair of cutter discs which rotate in opposite directions and have vertical gap therebetween and are configured for cutting the cotton tops, the cutter discs each are provided with a circle of cutter teeth, and by virtue of relative rotation between the cutter teethes on the cutter disc set, cotton stalks are cut, and the cotton tops cut are brought to a rear of the unmanned aerial vehicle in a forward direction.

2. The cotton topping unmanned aerial vehicle having the cutter discs and front grain lifting baffle plates according to claim 1, wherein the unmanned aerial vehicle body is one selected from a group consisted of an electric unmanned aerial vehicle body, an oil-powered unmanned aerial vehicle body and a hybrid electric unmanned aerial vehicle body.

3. The cotton topping unmanned aerial vehicle having the cutter discs and front grain lifting baffle plates according to claim 1, wherein the motor mounting base is shaped as a square, and a side length of the square is 25 cm-35 cm.

4. The cotton topping unmanned aerial vehicle having the cutter discs and front grain lifting baffle plates according to claim 1, wherein the vertical gap between the pair of cutter discs in the cutter disc set is 0.5 mm-1.5 mm.

5. The cotton topping unmanned aerial vehicle having the cutter discs and front grain lifting baffle plates according to claim 1, wherein a diameter of the cutter disc in the cutter disc set is 5 cm-10 cm, and a rotating speed of the cutter disc is 12,000 r/min-18,000 r/min.

6. A method of carrying out cotton topping using the cotton topping unmanned aerial vehicle of claim 1 to cut the cotton top.

7. The method of claim 6 wherein the unmanned aerial vehicle body is one selected from a group consisted of an electric unmanned aerial vehicle body, an oil-powered unmanned aerial vehicle body and a hybrid electric unmanned aerial vehicle body.

8. The method of claim 6 wherein the motor mounting base is shaped as a square, and a side length of the square is 25 cm-35 cm.

9. The method of claim 6 wherein the vertical gap between the pair of cutter discs in the cutter disc set is 0.5 mm-1.5 mm.

10. The method of claim 6 wherein a diameter of the cutter disc in the cutter disc set is 5 cm-10 cm, and a rotating speed of the cutter disc is 12,000 r/min-18,000 r/min.

* * * * *